M. MORTON.
Horse-Power.
No. 227,037.  Patented April 27, 1880.
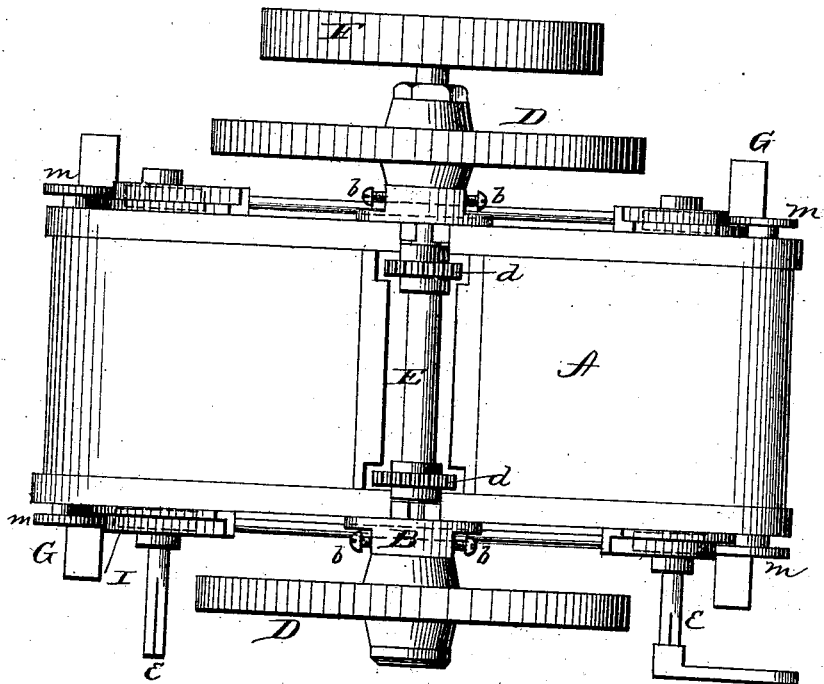
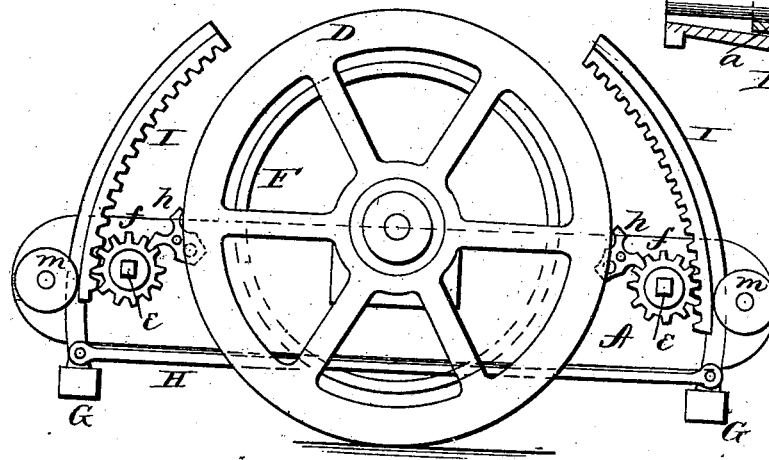
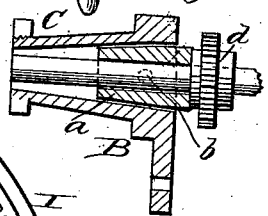
Witnesses:
Franck L. Ouraud
J. J. McCarthy
Inventor:
M. Morton
By Alexander Mason
Atty

UNITED STATES PATENT OFFICE.

MATTHEW MORTON, OF ROMEO, MICHIGAN.

HORSE-POWER.

SPECIFICATION forming part of Letters Patent No. 227,037, dated April 27, 1880.

Application filed January 23, 1880.

*To all whom it may concern:*

Be it known that I, MATTHEW MORTON, of Romeo, in the county of Macomb, and in the State of Michigan, have invented certain new and useful Improvements in Horse-Powers; and I do hereby declare that the following is a full, clear, and exact description thereof, reference being had to the accompanying drawings, and to the letters of reference marked ereon, making a part of this specification.

The nature of my invention consists in the nstruction and arrangement of a horse-power nich is reversible and can be elevated at any angle desired, as will be hereinafter more fully set forth.

In order to enable others skilled in the art to which my invention appertains to make and use the same, I will now proceed to describe its construction and operation, referring to the annexed drawings, in which—

Figure 1 is a plan view, and Fig. 2 a side elevation, of my horse-power.

A represents the frame of a tread-mill horse-power, on each side of which is secured a metal bracket, B. This bracket is formed with a skein or hollow spindle, C, upon which the driving-wheel D is placed. At the inner end of the skein or hollow spindle is an enlargement or recess to receive the journal-box $a$ for the shaft E, said shaft passing through the center of the spindle. The box is adjustable, hanging on centers $b\,b$. The hole for one of these centers (set-screws) is made oblong, making the box self-adjusting to the shaft. One end of the shaft E is projected beyond the spindle, and a band-wheel, F, secured thereon. The shaft is also provided with pinions $d\,d$, which are the driven pinions from the endless chain.

Through each end of the frame A is passed a shaft, $e$, which, near each end, close to the outer side of the frame, is provided with a pinion, $f$, and this pinion meshes with a curved rack-bar, I. The two curved rack-bars at each end of the machine are secured to a sill, G, and a rod, H, connects the two rack-bars on each side of the machine, said rod being pivoted to the rack-bars.

In moving the horse-power the sills G G are run up, as shown in Fig. 2, the horse-power being then supported upon the wheels D D.

For use, the sills are run down by applying a crank to the ends of the shafts $e\,e$, so that the power will be held firm and steady.

It will readily be understood that the power may be elevated at any angle desired, and is also reversible, so that either end can be used up, and thus every part wear equally, and the power last longer than when run always in one way. When the power is stopped it may be run down or adjusted level, so as to rest the horse, and the front end may be lowered, so as to take the horses out head first, instead of backing them out.

$h\,h$ are double pawls, to be thrown into the pinions $f$ for holding the power in any position. $m\,m$ are wheels or guides for keeping the rack-bars in gear with the pinions.

Having thus fully described my invention, what I claim as new, and desire to secure by Letters Patent, is—

1. A tread-mill horse-power mounted on wheels and provided with devices to adapt it to be reversible and adjustable at different elevations, for the purposes herein set forth.

2. The combination of the horse-power frame A, sills G, with rack-bars I, connecting-rods H, and shafts $e$, with pinions $f$, substantially as and for the purposes herein set forth.

3. The combination of the rack-bars I, pinions $f$, wheels $m$, and double pawls $h$, as and for the purposes herein set forth.

4. The combination of the bracket B, with hollow spindle C, shaft E, and interior box, $a$, hung upon adjustable centers $b$, substantially as herein set forth.

In testimony that I claim the foregoing I have hereunto set my hand this 14th day of January, 1880.

MATTHEW MORTON.

Witnesses:
FRED. C. BUZZELL,
A. C. SMITH.